US009618992B2

(12) United States Patent
Ide

(10) Patent No.: US 9,618,992 B2
(45) Date of Patent: Apr. 11, 2017

(54) INFORMATION PROCESSING APPARATUS AND CONTROL METHOD THEREFOR

(75) Inventor: Hiroyasu Ide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 12/481,419

(22) Filed: Jun. 9, 2009

(65) Prior Publication Data

US 2009/0313493 A1   Dec. 17, 2009

(30) Foreign Application Priority Data

Jun. 12, 2008   (JP) ................................. 2008-154128

(51) Int. Cl.
*G06F 1/32* (2006.01)

(52) U.S. Cl.
CPC ............ *G06F 1/3203* (2013.01); *G06F 1/325* (2013.01); *G06F 1/3215* (2013.01); *G06F 1/3287* (2013.01); *G06F 1/3284* (2013.01)

(58) Field of Classification Search
CPC .... G06F 1/32084; G06F 1/266; G06F 1/3203; G06F 1/3234; G06F 1/3287; G06F 1/3231; G06F 1/3284
USPC ............................ 713/300, 320, 323; 399/88
See application file for complete search history.

(56) References Cited

U.S. PATENT DOCUMENTS

| 5,877,483 | A | * | 3/1999 | Bilich ...................... G06F 21/34 235/380 |
| 5,919,264 | A | * | 7/1999 | Reneris ......................... 713/324 |
| 8,228,534 | B2 | * | 7/2012 | Azuma et al. ................ 358/1.15 |
| 2005/0071698 | A1 | * | 3/2005 | Kangas .................. G06F 1/3203 713/300 |
| 2005/0120250 | A1 | * | 6/2005 | Adachi ......................... 713/300 |
| 2005/0273635 | A1 | * | 12/2005 | Wilcox et al. ................ 713/320 |
| 2006/0035527 | A1 | * | 2/2006 | Numano ............... G06F 1/3203 439/668 |
| 2007/0023499 | A1 | * | 2/2007 | Wurzburg et al. ............ 235/376 |
| 2007/0049058 | A1 | * | 3/2007 | Kobayashi ...................... 439/13 |
| 2007/0286630 | A1 | * | 12/2007 | Watanabe et al. .............. 399/88 |
| 2007/0288784 | A1 | * | 12/2007 | Koper et al. .................. 713/324 |
| 2008/0195879 | A1 | * | 8/2008 | Asmi et al. ................... 713/323 |

(Continued)

FOREIGN PATENT DOCUMENTS

| JP | 2003-044177 A | 2/2003 |
| JP | 2005-216117 A | 8/2005 |

(Continued)

*Primary Examiner* — Kim Huynh
*Assistant Examiner* — Brandon Kinsey
(74) *Attorney, Agent, or Firm* — Canon USA, Inc. I.P. Division

(57) ABSTRACT

An information processing apparatus which operates in one of a normal power state and a plurality of power saving states, includes a storage unit to store power saving information that designates one of the plurality of power saving states, an acquisition unit to acquire from the connected peripheral device identification information for identifying the peripheral device, a specification unit to specify the power saving information associated with the acquired identification information based on the identification information and the setting information, and a control unit to control the apparatus to shift to the power saving state designated by the power saving information to the power saving state that is designated by the specified power saving information.

12 Claims, 7 Drawing Sheets

(56) References Cited

U.S. PATENT DOCUMENTS

| | | | |
|---|---|---|---|
| 2009/0063877 A1* | 3/2009 | Lewis | G06F 1/266 713/310 |
| 2009/0083560 A1* | 3/2009 | O'Connell et al. | 713/323 |
| 2009/0217065 A1* | 8/2009 | Araujo, Jr. | 713/320 |

FOREIGN PATENT DOCUMENTS

| | | |
|---|---|---|
| JP | 2007-288532 A | 11/2007 |
| JP | 2007-334304 A | 12/2007 |
| JP | 2008-017355 A | 1/2008 |

* cited by examiner

FIG.4

| ATTRIBUTE INFORMATION | USER A (MANAGERIAL STAFF) | UESER B (GENERAL OFFICE WORKER) |
|---|---|---|
| MONOCHROMATIC COPYING | ○ | ○ |
| COLOR COPYING | ○ | × |
| TRANSMISSION/ FAX | ○ | ○ |
| BOX | ○ | ○ |

FIG.5

| USB DEVICE NAME | USB CLASS ID | VENDOR ID | PRODUCT ID | SHIFTABILITY TO "SLEEP STATE" | SHIFT TIME TO "SLEEP STATE" |
|---|---|---|---|---|---|
| NO USB DEVICES CONNECTED TO MFP | — | — | — | SHIFTABLE TO "SLEEP STATE 1" | 10 MIN. |
| AUTHENTICATION CARD READER | 05H | 1000H | 0001H | UNSHIFTABLE TO "SLEEP STATE" | — |
| BIOMETRIC AUTHENTICATION DEVICE | 06H | 1001H | 0002H | UNSHIFTABLE TO "SLEEP STATE" | — |
| HUMAN PRESENCE SENSOR | 07H | 1002H | 0003H | UNSHIFTABLE TO "SLEEP STATE 1" SHIFTABLE TO "SLEEP STATE 2" | 1 MIN. |
| MULTIMEDIA CARD READER | 08H | 1003H | 0004H | UNSHIFTABLE TO "SLEEP STATE" | — |
| USB MEMORY | 09H | 1004H | 0005H | UNSHIFTABLE TO "SLEEP STATE" | — |
| BLUETOOTH COMMUNICATION DEVICE | 10H | 1005H | 0006H | SHIFTABLE TO "SLEEP STATE 1" | 10 MIN. |
| IrDA COMMUNICATION DEVICE | 11H | 1006H | 0007H | SHIFTABLE TO "SLEEP STATE 1" | 10 MIN. |
| KEYBOARD | 12H | 1007H | 0008H | UNSHIFTABLE TO "SLEEP STATE 1" SHIFTABLE TO "SLEEP STATE 2" | 10 MIN. |

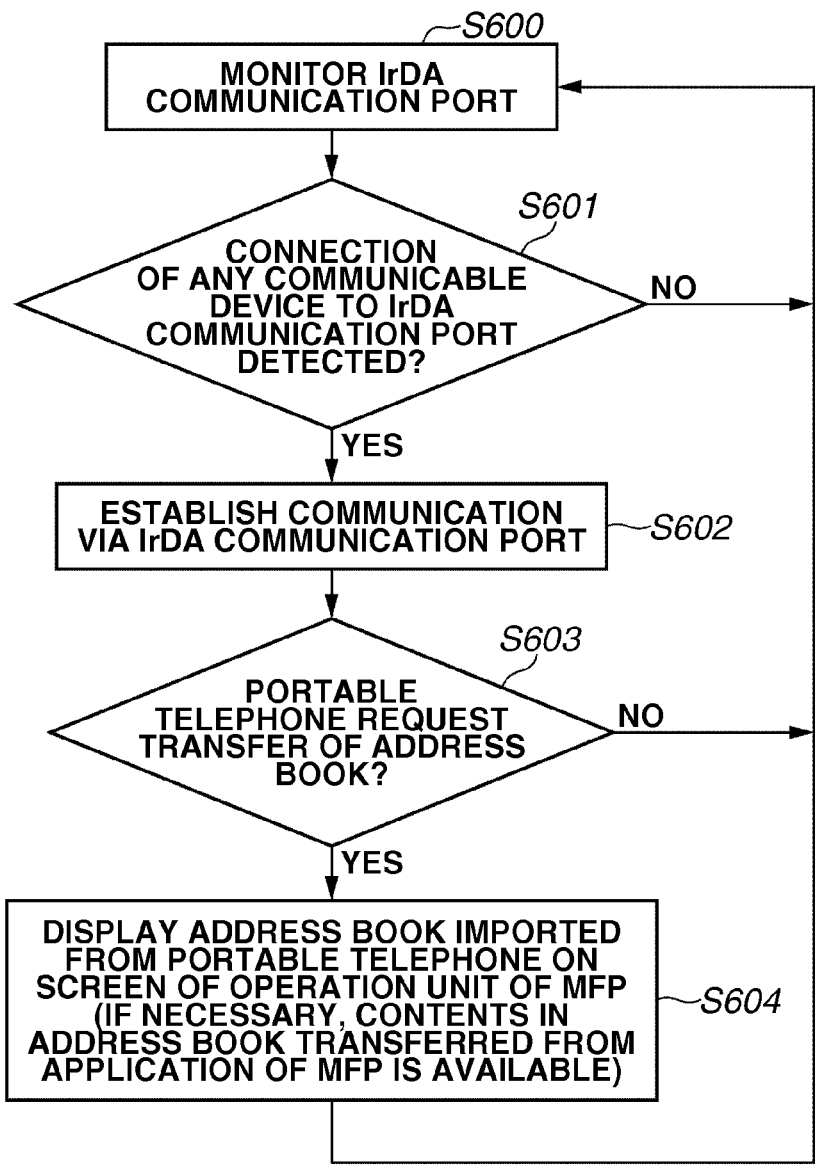

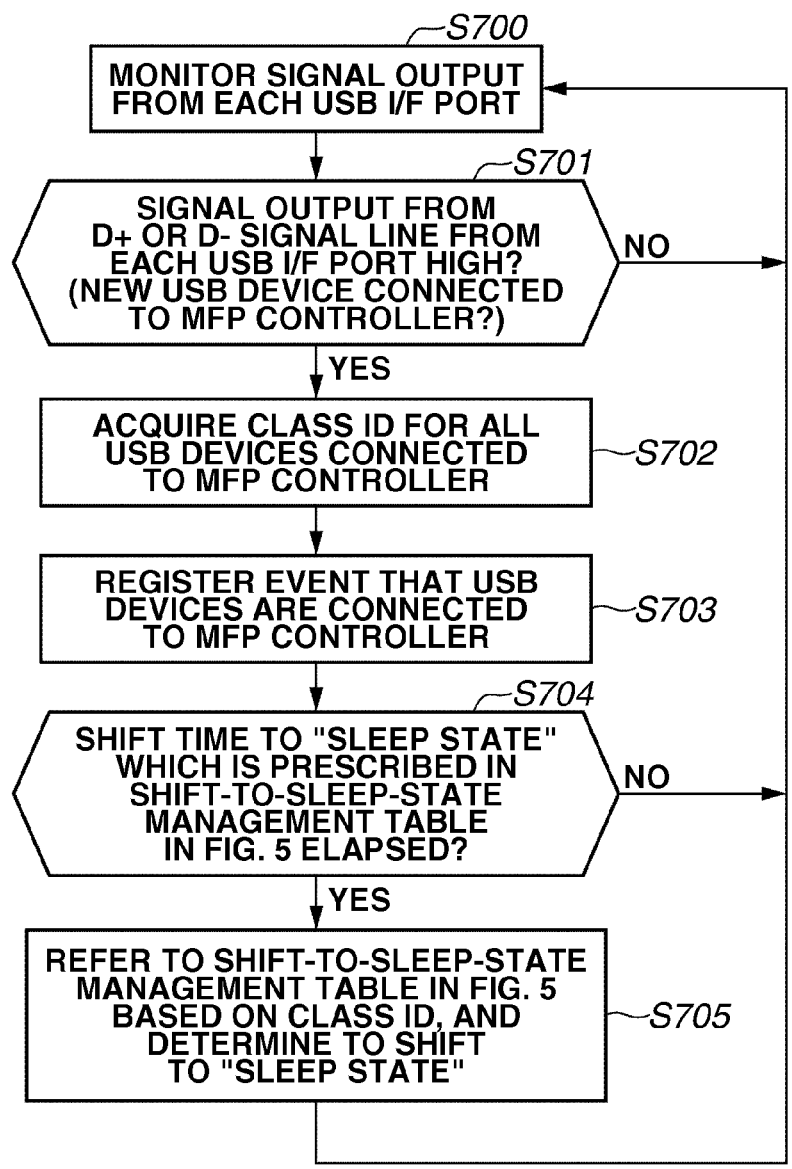

INFORMATION PROCESSING APPARATUS AND CONTROL METHOD THEREFOR

BACKGROUND OF THE INVENTION

Field of the Invention

The present invention relates to an information processing apparatus and a control method therefor.

Description of the Related Art

Recently, from consideration of environment, power consumption reduction, i.e., power saving has progressed in overall electric and electronic products, such as home electric appliances and office equipment. Among image processing apparatuses, such as a multi-function peripheral (MFP) having a plurality of functions, e.g., an original document reading function, a printing function, and a communication function, some power saving models have been put into practical use which achieves power saving by, e.g., automatically shifting to a power saving mode when no operation is performed for a predetermined time.

The power saving of the MFPs has progressed, while multifunctionalization thereof has progressed. A form of multifunctionalization which connects peripheral devices to an MFP via universal serial bus (USB) interfaces (USB I/Fs) is increasing. Examples of the peripheral devices are an authentication card reader, a multimedia card reader, and a keyboard.

As an example of a conventional power saving technique, Japanese Patent Application Laid-Open No. 2005-216117 discusses a technique that reduces power consumption while peripheral devices (USB devices) are connected to an image processing apparatus via a USB I/F. More specifically, Japanese Patent Application Laid-Open No. 2005-216117 describes a configuration in which the USB devices connected to the image processing apparatus are shifted to a disuse state when the image processing apparatus is shifted to a disuse state.

However, there are various types of peripheral devices to be connected to an image processing apparatus. It may be undesirable for some peripheral devices to be shifted to a disuse state when an image processing apparatus is shifted to a disuse state. For example, when an authentication card reader is connected to an image processing apparatus as a peripheral device, it is undesirable to shift, when the image processing apparatus is in a disuse state, the authentication card reader to a disuse state. This is because the authentication card reader in the disuse state cannot perform an authentication operation even when a user tries to log into the image processing apparatus via the authentication card reader.

SUMMARY OF THE INVENTION

The present invention is directed to an improved information processing apparatus and an improved control method therefor. More particularly, the present invention is directed to an information processing apparatus, a control method therefor, and a program for causing a computer to execute the control method which can appropriately control which of a plurality of power saving states the information processing apparatus is shifted to according to what peripheral device is connected thereto.

According to an aspect of the present invention, an information processing apparatus which operates in one of a normal power state and a plurality of power saving states each of which is less in power consumption than the normal power state includes a connection unit configured to connect a peripheral device, a storage unit configured to store setting information associated with identification information for identifying which of a plurality of peripheral devices connectable to the connection unit is the peripheral device connected to the connection unit and with power saving information that designates one of the plurality of power saving states, an acquisition unit configured to acquire from the peripheral device connected to the connection unit the identification information for identifying the peripheral device, a specification unit configured to specify the power saving information associated with the acquired identification information based on the identification information acquired by the acquisition unit and on the setting information stored in the storage unit, and a control unit configured to control the information processing apparatus to shift to the power saving state designated by the power saving information upon satisfaction of a condition for shifting the information processing apparatus to the power saving state that is designated by the power saving information specified by the specification unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a user attribute management table stored in the MFP.

FIG. 5 illustrates a shift-to-sleep-state management table stored in the MFP.

FIG. 6 is a flowchart of a process for transferring contents of an address book of a portable telephone via an infrared data association (IrDA) communication device which is performed in the MFP controller.

FIG. 7 is a flowchart of a USB device determination process performed in the MFP controller when a USB device is connected thereto.

DETAILED DESCRIPTION OF THE EMBODIMENTS

Various exemplary embodiments, features, and aspects of the invention will be described in detail below with reference to the drawings.

Figure 1:
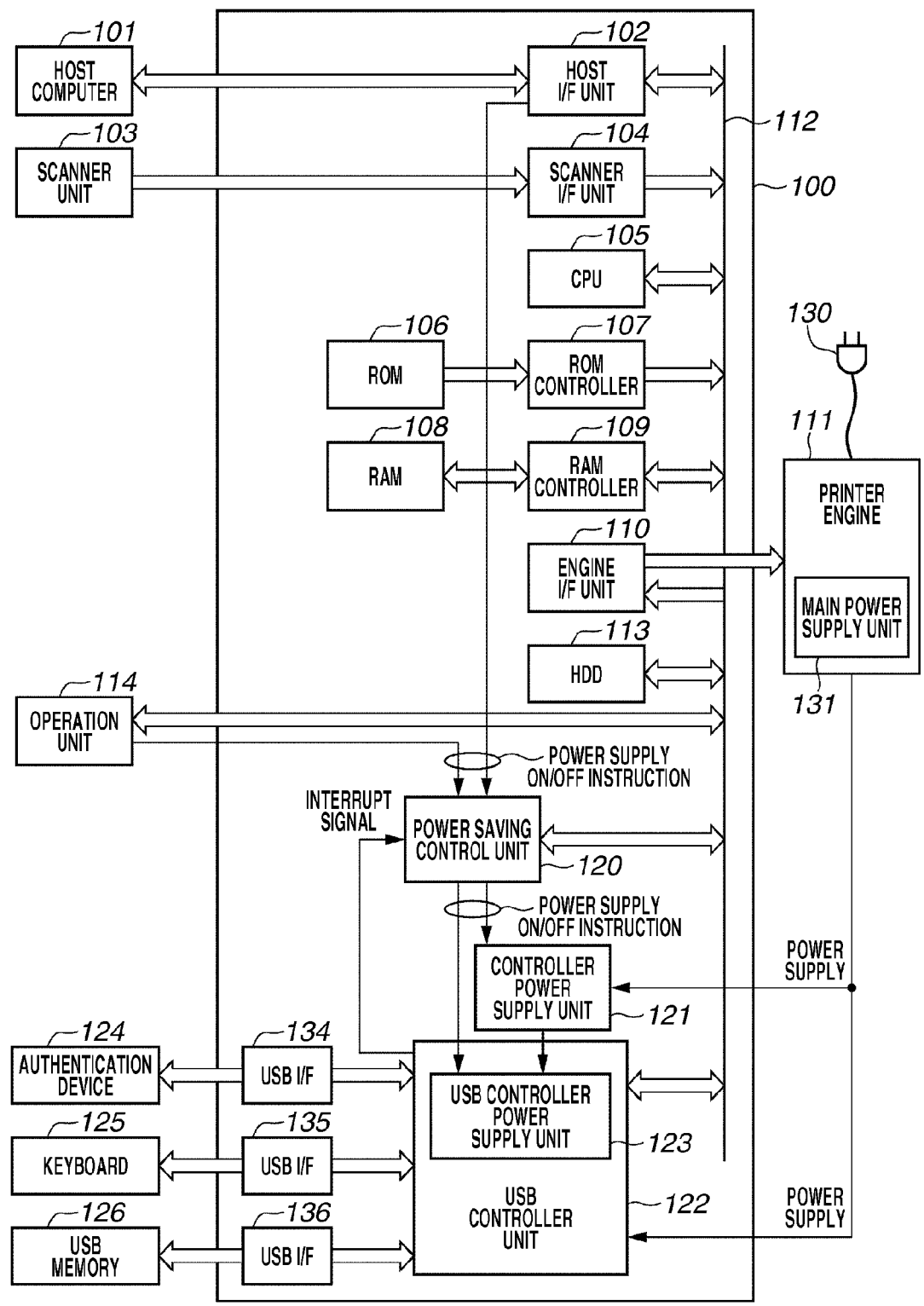
FIG. 1 is a block diagram of a configuration of an MFP which serves as an information processing apparatus according to an exemplary embodiment of the present invention, centering on a controller (hereinafter referred to as an MFP controller) of the MFP.

FIG. 1 is a block diagram of a configuration of an MFP which serves as an information processing apparatus according to an exemplary embodiment of the present invention, centering on the MFP.

As illustrated in FIG. 1, the MFP includes an MFP controller 100, a scanner unit 103, a printer engine 111, a printer unit (not shown), and an operation unit 114. The MFP is an image processing apparatus having a plurality of functions, such as an original document reading function, a printing function, and a communication function. Incidentally, the configuration illustrated in FIG. 1 is an example for implementing a connection unit, a storage unit, an acquisition unit, a specification unit, a control unit, a first power supply unit, and a second power supply unit.

The MFP has a plurality of power saving states (a "sleep state 1", and a "sleep time 2" which are described below) for reducing power consumption and is constructed so that a plurality of USB devices (e.g., an authentication device 124, a keyboard 125, and a USB memory 126) serving as peripheral devices can be electrically connected thereto. The MFP can be utilized only by authorized users.

The MFP controller 100 includes a host I/F unit 102, a scanner I/F unit 104, a central processing unit (CPU) 105, a read-only memory (ROM) 106, a ROM controller 107, a random access memory (RAM) 108, and a RAM controller 109. The MFP controller 100 further includes an engine I/F unit 110, a hard disk drive (HDD) 113, a power saving control unit 120, a controller power supply unit 121, a USB controller unit 122, and a plurality of USB I/Fs 134, 135, and 136.

The MFP controller 100 is constructed to be able to communicate with the host computer 101 via a network. The MFP controller 100 performs various processes including the following major processes, i.e., a process for rasterizing print data (print code data) received from the host computer 101 into bitmap data and outputting the bitmap data to the printer engine 111, and a process for outputting scanned image data read by the scanner unit 103 from an original document to the printer engine 111.

The MFP controller 100 is constructed to be able to shift to one of the "sleep state 1" (corresponding to the first power saving state) and the "sleep state 2" (corresponding to the second power saving state) as the power saving state in which power consumption is reduced. A condition for shifting the MFP controller 100 to the "sleep state 1" or the "sleep state 2" is determined based on a shift-to-sleep-state management table (FIG. 5).

In the "sleep state 1" (the first power saving state), under the control of the CPU 105 and the power saving control unit 120, supply of electric power from the controller power supply unit 121 is stopped (i.e., off). In addition, supply of electric power from a USB controller power supply unit 123 is stopped (i.e., off). Thus, supply of electrical power to the USB device is off. The "sleep state 1" (the first power saving state) is the power saving state in which the power consumption is largely reduced.

In the "sleep state 2" (the second power saving state), under the control of the CPU 105 and the power saving control unit 120, supply of electric power from the controller power supply unit 121 is stopped (i.e., off). In addition, supply of electric power from a USB controller power supply unit 123 is performed (i.e., on). Consequently, supply of electrical power to the USB device is on (i.e., power supply thereto is continued). In addition, communication between the USB devices and the USB controller unit 122 is maintained. The "sleep state 2" (the second power saving state) is the power saving state in which reduction in the power consumption is small as compared with the "sleep state 1" (the first power saving state).

The host I/F unit 102 communicates with the host computer 101 and receives print data (print code data) and image data which are described in a printer's native language therefrom. The scanner I/F unit 104 receives scanned image data which is input from the scanner unit 103 and read from the original document.

The CPU 105 (corresponding to the acquisition unit and the control unit) reads a control program stored in the ROM 106 via the ROM controller 107 and controls the entire MFP controller 100 via an internal bus 112 based on the control program. The CPU 105 executes processes illustrated in flowcharts in FIGS. 2, 3, 6, and 7, respectively based on the program.

The CPU 105 performs a power saving control operation when a USB device is electrically connected to the MFP controller 100 via the USB I/F as follows. More specifically, the CPU 105 performs the power saving control operation by determining, based on the identification information acquired from the USB device and the setting information stored in the shift-to-sleep-state management table, whether the information processing apparatus can shift to the "sleep state 1" (the first power saving state) or to the "sleep state 2" (the second power saving state). The power saving control operation is described below in detail with reference to the flowcharts, i.e., FIGS. 2, 3, 6, and 7.

The ROM 106 (corresponding to the storage unit) stores the control program, the user attribute management table (see FIG. 4), and the shift-to-sleep-state management table (see FIG. 5). Accesses to the ROM 106 are performed by the ROM controller 107. The RAM 108 is utilized as a work memory for performing various processes to be described below, and as a buffer for storing image data. Accesses to the RAM 108 are performed via the RAM controller 109.

The engine I/F unit 110 outputs print data (image data) to the printer engine 111. The printer engine 111 performs a process for printing an image on paper based on the print data. The HDD 113 is used to temporarily store the print data and to store user data. The operation unit 114 receives users' instructions for various operations on the MFP, and displays a state of the MFP. The operation unit 114 includes a power supply button, various keys, a sleep-state reset switch, a logoff key, and a liquid crystal display (LCD) unit, which are not illustrated in the drawings.

The printer engine 111 includes a main power supply unit 131. The main power supply unit 131 has functions of converting alternating-current (AC) power supplied from a commercial power supply via an AC outlet plug 130 into direct-current (DC) power (hereunder referred to as power) and supplying the power to the controller power supply unit 121. The controller power supply unit 121 (corresponding to the first power supply unit) supplies power to the entire MFP controller 100 based on power supplied from the main power supply unit 131.

The USB controller unit 122 (corresponding to the connection unit) includes the USB controller power supply unit 123. The USB devices (e.g., the authentication device 124, the keyboard 125, and the USB memory 126) are electrically connected to the MFP controller 100 via the USB I/Fs 134, 135, and 136 and the USB controller unit 122.

An integrated circuit (IC) constituting each of the USB devices (e.g., the authentication device 124, the keyboard 125, the USB memory 126) preliminarily stores a USB class ID, a vender ID, and a product ID which are described below. The keyboard 125 is equipped in a personal computer (PC) installed in the vicinity of the MFP. The USB controller power supply unit 123 (corresponding to the second power supply unit) supplies power to the authentication device 124, the keyboard 125, and the USB memory 126 via the USB I/Fs 134, 135, and 136 based on power supplied from the main power supply unit 131.

Various USB devices having USB I/Fs other than the authentication device 124, the keyboard 125, and the USB memory 126 can be connected to the USB controller unit 122 (see FIG. 5). Consequently, the MFP can perform various function enhancements.

Figure 2:
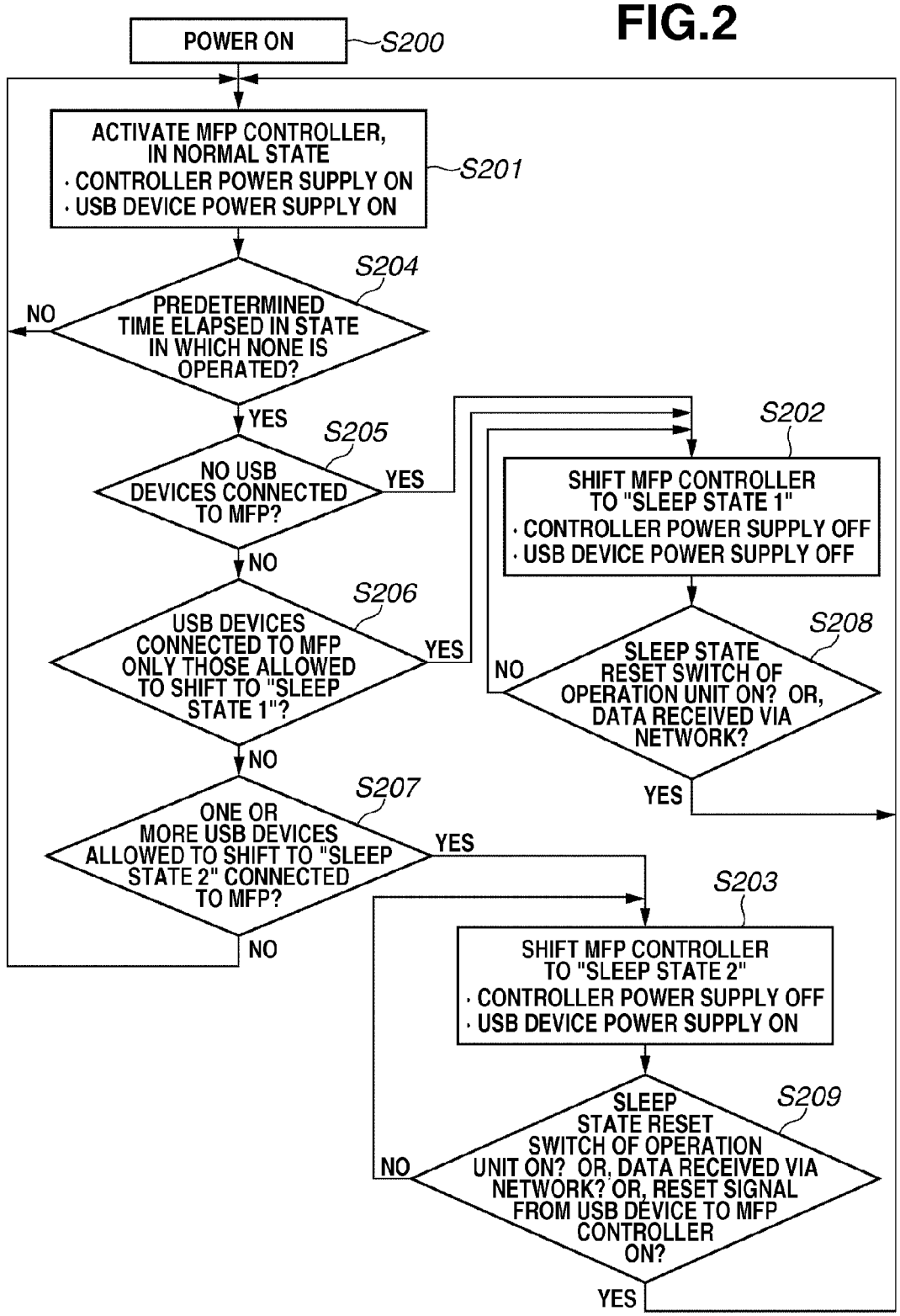
FIG. 2 is a flowchart of a process relating to a power saving control operation which is performed in the MFP controller.

The power saving control unit 120 performs control operations of switching on/off of each of the controller power supply unit 121 and the USB controller power supply unit 123 under the control of the CPU 105 in each case illustrated in the flowchart in FIG. 2. The MFP controller 100 can shift from a normal state (normal power state) to the power saving state (the "sleep state 1" or the "sleep state 2") by the power saving control performed by the CPU 105 and the power saving control unit 120.

Even in a case where the controller power supply unit 121 is set in the power saving state by an instruction from the power saving control unit 120, only the host I/F unit 102 and the operation unit 114 are supplied with power. Consequently, even when the controller power supply 121 is set in the power saving state, the MFP controller 100 can monitor reception of data transmitted from the host computer 101. In addition, the MFP controller 100 can detect various inputs (i.e., inputs via various keys, the sleep-state reset switch, the logoff key, and the like) from users via the operation unit 114.

When the host I/F unit 102 detects the reception of data transmitted from the host computer 101, or when the sleep-state reset switch (not shown) equipped in the operation unit 114 is pushed, the power saving control unit 120 performs the following control operation. More specifically, the power saving control unit 120 instructs the controller power supply unit 121 to reset a power saving mode (i.e., a mode in which the power consumption is reduced) to a normal mode (i.e., a mode in which the power consumption is not reduced). Consequently, the control power supply unit 121 turns on the power supply for the MFP controller 100.

The authentication device 124 is constructed as, e.g., an authentication card reader (or IC card reader), and connected to the MFP controller 100 via the USB I/F 134 and the USB controller unit 122. Accesses to the MFP can be controlled using the authentication device 124. The keyboard 125 is used to input various data, and connected to the MFP controller 100 via the USB I/F 135 and the USB controller unit 122. The USB memory 126 stores various data, and is connected to the MFP controller 100 via the USB I/F 136 and the USB controller unit 122.

The USB devices connectable to the MFP according to the present exemplary embodiment including the authentication device 124 and the USB memory 126 preliminarily store device information which is described below. When the USB device is connected to the MFP controller 100, the CPU 105 of the MFP controller 100 acquires device information from the USB device connected thereto and performs the power saving control operation based on contents registered in the shift-to-sleep-state management table, which is described below, and the device information. The power saving control operation is described in detail below.

Figure 3:
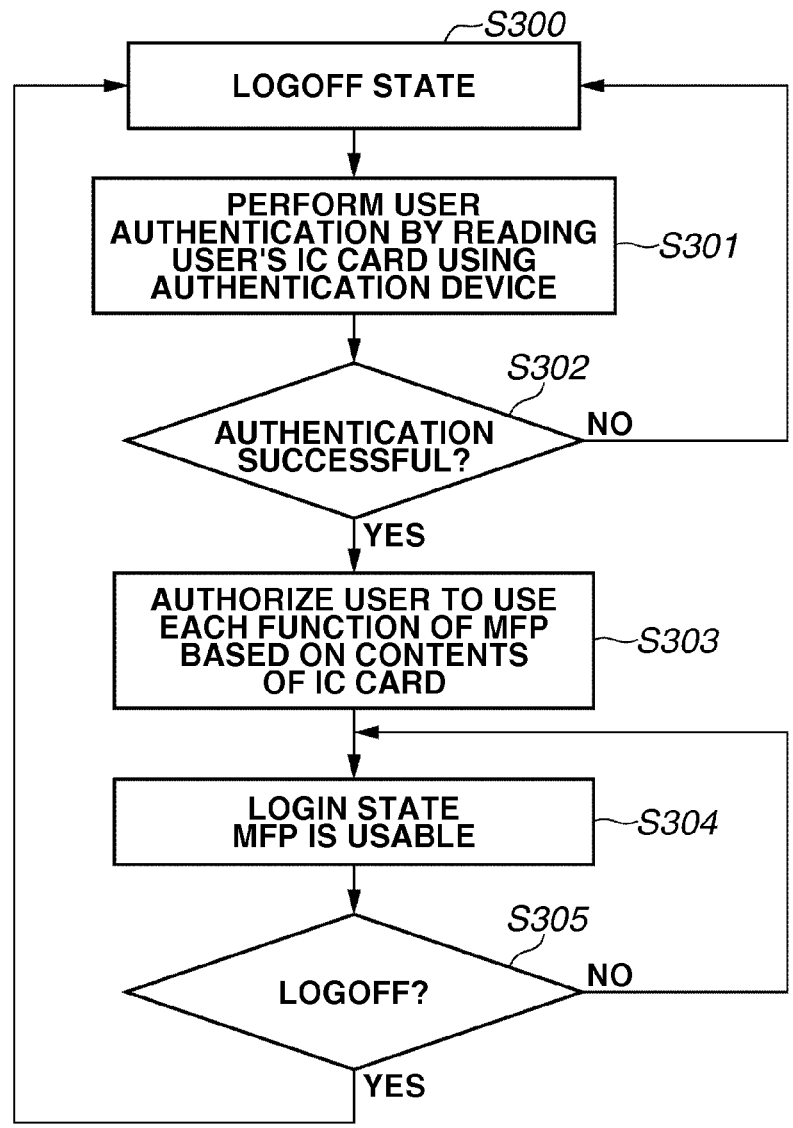
FIG. 3 is a flowchart of a process relating to user authentication and login which is performed by an authentication device in the MFP controller.

Next, a control operation is described which is performed by the MFP according to the present exemplary embodiment having the above configuration when a user accesses the MFP using the authentication device 124 with reference to the flowchart illustrated in FIG. 3.

FIG. 3 is a flowchart of a process relating to user authentication and login which is performed in the MFP controller 100 using the authentication device 124.

It is assumed in the flowchart illustrated in FIG. 3 that a plurality of users who can utilize the MFP installed in, e.g., a corporate office respectively has IC cards which record their own attribute information (representing available functions of the MFP for the user). When a user uses the MFP, first, in step S300, the user is subjected to user authentication (or login authentication) by the MFP in a logoff state. In step S301, the user inserts the IC card possessed by the user into the authentication device 124 (i.e., the authentication card reader). Then, the CPU 105 of the MFP controller 100 performs user authentication based on information read from the IC card with the authentication device 124.

In step S302, the CPU 105 determines whether the user authentication in step S301 is successful. If the CPU 105 determines that the user authentication is failed (NO in step S302), the CPU 105 returns to step S300. Thus, a logoff state is continued. If the CPU 105 determines that the user authentication is successful (YES in step S302), in step S303, the CPU 105 authorizes the user to use each function of the MFP based on the information read from the IC card by the authentication device 124. This authentication is referred to as functional authentication.

FIG. 4 illustrates a correspondence between the user's attribute information (the available function of the MFP for the user) and each available function of the MFP. The user attribute management table illustrated in FIG. 4 indicates the correspondence between the attribute information of each of two types of users, namely, a "user A" (managerial staff) and a "user B" (general office worker), and each available function of the MFP. The user attribute management table is stored in the rewritable ROM 106 in the MFP controller 100.

When a "monochromatic copying function" of the MFP is utilized, both of the user A (managerial staff) and the user B (general office worker) are authorized to use the "monochromatic copying function" (this is indicated by a circle mark ○). When a "color copying function" of the MFP is utilized, the user A (managerial staff) is authorized to use the "color copying function" (as indicated by a circle mark ○), while the user B (general office worker) is not authorized to use the "color copying function" (as indicated by a cross mark x). When a "transmission/facsimile (FAX) function" of the MFP is utilized, both of the user A (managerial staff) and the user B (general office worker) are authorized to use the "transmission/FAX function" of the MFP. When a "BOX function" (i.e., a function of storing data in a hard disk or the like) of the MFP is utilized, both of the user A (managerial staff) and the user B (general office worker) are authorized to use the "BOX function" of the MFP.

More specifically, when it is determined based on the user's attribute information that an authenticated user is the user A (managerial staff), the user A (managerial staff) is authorized to use all of the functions including the color copying function of the MFP. On the other hand, when it is determined based on the user's attribute information that an authenticated user is the user B (general office worker), the user B (general office worker) is authorized to use the functions other than the "color copying function" of the MFP.

When the above functional authentication for a user is successful, in step S304, the MFP is brought into a login state for the user. The CPU 105 sets the MFP in a usable state. Subsequently, in step S305, when the user finishes use of the functions (the color copying function, the monochromatic copying function, the FAX function and the like) and presses the logoff key (not illustrated) equipped in the operation unit 114 (YES in step S305), the CPU 105 detects that the MFP is logged off. Consequently, the MFP returns to the logoff state.

The MFP controller 100 can perform print out based on print data received from the host computer 101 and based on the scanned image data read from the original document by the scanner 103 by performing the above control operation.

Next, a power saving operation of the MFP controller 100 is described based on the flowchart illustrated in FIG. 2.

FIG. 2 is a flowchart of a process relating to the power saving control operation which is performed in the MFP controller 100.

As illustrated in FIG. 2, in step S200, when the CPU 105 of the MFP controller 100 detects that a user turns on a power supply button of the MFP (i.e., power-on of the MFP), in step S201, the MFP controller 100 is activated. In the normal state after the MFP controller 100 is activated, the controller power supply unit 121 is in an on-state. In addition, the USB controller power supply unit 123 is in an on-state. Thus, supply of power to the USB devices is maintained.

Next, in step S204, the CPU 105 determines whether predetermined time has elapsed while no operation is performed by the user. When the predetermined time has elapsed while no operation is performed by the user on the operation unit 114 and no print data is received from the host computer 101 via the network in a state in step S201, a condition in step S204 is satisfied.

The predetermined time is time (hereunder abbreviated as a shift time) taken to shift to the sleep state (i.e., the power saving state in which power consumption is reduced) which is set in the shift-to-sleep-state management table illustrated in FIG. 5. The CPU 105 determines whether to shift the MFP controller 100 to the sleep state and a relation of the shift time to the sleep state based on the shift-to-sleep-state management table according to the type of the USB device connected to the MFP. Users can arbitrarily set the type of the USB device in the shift-to-sleep-state management table, shiftability to the sleep state, and the shift time to the sleep state according to the specifications of the MFP.

The types (or device names) of USB devices registered in the shift-to-sleep-state management table are as follows, in addition to the authentication device 124 (or authentication card reader), the keyboard 125, and the USB memory 126 illustrated in FIG. 1. That is, the USB devices include a biometric authentication device, a human body presence sensor (hereunder referred to as a human presence sensor), a multimedia card reader, a Bluetooth communication device, and an IrDA communication device. In each of the USB devices, a USB class ID representing the class of the USB device, a vendor ID representing a manufacturer of the USB device, and a product ID representing the type of an IC constituting the USB device are set.

As described above, the shift-to-sleep-state management table illustrated in FIG. 5 stores setting information which includes the USB class ID, the vendor ID, the product ID, the shiftability to the sleep state, the shift time to the sleep state (i.e., shift time information) corresponding to each type of the USB device (or to each USB device name). Power saving information according to the present invention corresponds to information described in a "shiftability to "sleep state"" column in FIG. 5.

According to the present exemplary embodiment, when a USB device other than an authentication card reader, a biometric authentication device, a multimedia card reader, and a USB memory is connected to the MFP, the MFP controller 100 is set to be able to shift to the "sleep state 1" or the "sleep state 2". According to the present exemplary embodiment, the shift time to the sleep state is set at 1 minute when a human presence sensor is connected to the MFP, and at 10 minutes when a Bluetooth communication device, an IrDA communication device, or a keyboard is connected to the MFP, or when no USB devices are connected thereto.

Thus, the CPU 105 determines, based on the setting information stored in the shift-to-sleep-state management table illustrated in FIG. 5 and the device information (identification information) acquired from the USB device connected to the MFP, which of the power saving states the MFP controller 100 is shifted or not shifted to. The device information (identification information) includes the USB class ID, the vendor ID, and the product ID.

In the shift-to-sleep-state management table illustrated in FIG. 5, e.g., "1 minute" or "10 minutes" is set as the shift time to the sleep state. Accordingly, the condition in step S204 is satisfied when "1 minute" or "10 minutes" has elapsed while no operation is performed by the user using the operation unit 114 and no print data is received via the network.

If the condition in step S204 is satisfied (YES in step S204), the process proceeds to step S205. In step S205, if no USB devices are connected to the MFP (YES in step S205), a condition in step S205 is satisfied. Thus, in step S202, the CPU 105 causes the power saving control unit 120 to shift the MFP controller 100 to the "sleep state 1".

The condition for shifting the MFP controller 100 to the "sleep state 1" is determined based on the shift-to-sleep-state management table illustrated in FIG. 5. In the "sleep state 1" in step S202, the controller power supply unit 121 is turned off. In addition, the USB controller power supply unit 123 in the USB controller unit 122 is turned off (thus, supply of power to the USB device is turned off).

More specifically, when no USB devices are connected to the MFP controller 100, the power consumption of the MFP controller 100 can be reduced to a minimum by turning off the controller power supply unit 121 and the USB controller power supply unit 123.

If the condition in step S204 is satisfied and only the USB device which is allowed to shift to the "sleep state 1" based on the shift-to-sleep-state management table is connected to the MFP (YES in step S206), a condition in step S206 is satisfied. In other words, in this case, only the USB devices associated with the setting information in which the MFP controller 100 is allowed to shift to the "sleep state 1" are connected to the MFP. In step S202, even in this case, the CPU 105 causes the power saving control unit 120 to shift the MFP controller 100 to the "sleep state 1".

When the USB device is connected to the USB controller unit 122 via the USB I/F, the CPU 105 acquires the above device information from the USB device via the USB controller unit 122.

According to the present exemplary embodiment, when an IrDA communication device is connected to the MFP controller 100, the following infrared data transfer can be performed. More specifically, a user can transfer contents of an address book of a portable telephone to the MFP as a destination of a FAX transmission or a SEND operation (i.e., an operation for transmitting an e-mail by attaching information thereto) via the IrDA communication device. FIG. 6 is a flowchart illustrating an operation flow in this case.

For example, when an IrDA communication port is connected to the USB I/F of the MFP controller 100, the CPU 105 recognizes IrDA communication port connection based on the USB class ID and the product ID in the shift-to-sleep-state management table illustrated in FIG. 5. Subsequently, in step S600, the CPU 105 monitors whether the connection of a communicable IrDA communication device (e.g., a portable telephone according to the present exemplary embodiment) to the IrDA communication port is detected.

If the connection of the portable telephone to the IrDA communication port is detected (YES in step S601), in step S602, the CPU 105 establishes communication between the portable telephone and the CPU 105 via the IrDA communication port. Then, in step S603, the CPU 105 waits for a request to transfer an address book from the portable telephone.

If there is the request to transfer the address book from the portable telephone (YES in step S603), then in step S604, the CPU 105 acquires contents of the address book of the portable telephone to the MFP. In addition, in step S604, the CPU 105 causes the LCD display unit of the operation unit 114 to display the contents of the address book which are acquired from the portable telephone, on a screen thereof. If necessary, the contents of the address book transferred from the portable telephone to the MFP can be utilized by various application programs (FAX and SEND programs and the like) executed on the MFP.

However, it is undesirable from the viewpoint of power saving that the MFP controller 100 cannot be shifted to the "sleep state" at all when the IrDA communication device is connected to the MFP controller 100 via the USB I/F. Thus, when the IrDA communication device is connected to the MFP controller 100, as illustrated in the shift-to-sleep-state management table shown in FIG. 5 (YES in step S206), the CPU 105 allows the MFP controller 100 to shift to the "sleep state 1".

Further, if a state in which a user performs no operation using the operation unit 114 and no print data is received via the network is continued 10 minutes or more, the MFP controller 100 is set to shift to the "sleep state 1".

A Bluetooth communication device is a USB device on which a control operation similar to that in the IrDA communication device is performed. Similar to connecting the IrDA communication device to the MFP, a user can transfer contents of an address book of a portable telephone to the MFP as a destination of FAX transmission.

If the condition in step S204 is satisfied and one or more USB devices which are allowed to shift to the "sleep state 2" based on the shift-to-sleep-state management table are connected to the MFP, a condition in step S207 is satisfied (YES in step S207). In other words, in this case, one or more USB devices associated with the setting information in which the MFP controller 100 is allowed to shift to the "sleep state 2" are connected to the MFP. In step S203, the CPU 105 causes the MFP controller 100 to shift to the "sleep state 2". Even in this case, the relationship between the USB device connected to the MFP controller 100 and the shift thereof to the sleep state is determined based on settings in the shift-to-sleep-state management table illustrated in FIG. 5.

That is, a condition for shifting the MFP controller 100 to the "sleep state 2" is determined based on the shift-to-sleep-state management table illustrated in FIG. 5. In the "sleep state 2" in step S203, the controller power supply unit 121 is turned off. However, the USB controller power supply unit 123 in the USB controller unit 122 is turned on (the supply of power to the USB device is continued). Consequently, the USB I/F maintains communication between the USB controller unit 122 and the USB device.

For example, when the keyboard 125 is connected to the MFP controller 100, and a user presses an arbitrary key of the keyboard 125, it is desirable that the MFP controller 100 returns to the normal state from the sleep state. Thus, as is seen from the shift-to-sleep-state management table illustrated in FIG. 5, when the keyboard is connected to the MFP controller 100, the CPU 105 allows the MFP controller 100 to shift to the "sleep state 2". Consequently, the controller power supply unit 121 is turned off. However, the USB controller power supply unit 123 is turned on. Thus, the supply of power to the keyboard 125 is continued.

When a user presses an arbitrary key of the keyboard 125, information associated with the pressed key is transmitted to the USB controller unit 122 via the USB I/F 135. Thus, an interrupt signal from the USB controller unit 122 to the power saving control unit 120 is generated. Accordingly, the power saving control unit 120 outputs an instruction to turn on the power supply to the controller power supply unit 121. Consequently, the controller power supply unit 121 is reset, so that the MFP controller 100 returns to the normal state in step S201 from the "sleep state 2" in step S203.

A human presence sensor is the USB device on which a control operation similar to that on the keyboard is performed. The human presence sensor is used for the following reason. When no user uses the MFP, the MFP controller 100 is shifted from the normal state to the sleep state as early as possible. On the other hand, when a user comes close to the apparatus to use the MFP, the MFP controller 100 immediately returns to the normal state from the sleep state. Thus, as indicated by the shift-to-sleep-state management table illustrated in FIG. 5, when the human presence sensor is connected to the MFP controller 100, the MFP controller 100 is set to be shifted to the "sleep state 2" in a short time (i.e., 1 minute) as compared with the case of connecting the keyboard 125 to the MFP.

If the condition in step S204 is satisfied and none of the conditions in steps S205, S206, and S207 are satisfied (NO in steps S205, S206, and S207), the process returns to step S201 and the MFP controller 100 maintains the normal state in step S201.

For example, when the authentication device 124 (authentication card reader) is connected to the USB controller unit 122 of the MFP controller 100 via the USB I/F 134, a user tries the user authentication prior to all operations. However, if the USB controller power supply unit 123 in the USB controller unit 122 is turned off, the user authentication cannot be performed. Thus, when the authentication device 124 is connected to the MFP controller 100, the CPU 105 does not allow the MFP controller 100 to shift to the sleep state, as indicated by the shift-to-sleep-state management table illustrated in FIG. 5.

A condition in step S208 for resetting the MFP controller 100 from the "sleep state 1" in step S202 to the normal state in S201 is satisfied when the sleep-state reset switch of the operation unit 114 is turned on, or when print data is received via the network. Consequently, the MFP controller 100 returns to the normal state from "the sleep state 1".

A condition in step S209 for resetting the MFP controller 100 from the "sleep state 2" in step S203 to the normal state in step S201 is satisfied when the sleep-state reset switch of the operation unit 114 is turned on, when print data is received via the network, or when an interrupt from the USB controller unit 122 to the power saving control unit 120 is generated. Consequently, the MFP controller 100 returns to the normal state from the "sleep state 2".

The interrupt to the power saving control unit 120 from the USB controller unit 122 is generated (i.e., a reset signal is on), e.g., when an arbitrary key of the keyboard 125 is pressed by a user. Consequently, even when the MFP controller 100 is in the "sleep state 2" which is the sleep state (i.e., a power supply off state) in step S203, the MFP controller 100 returns to the normal state and the controller power supply unit 121 can be reset.

Similarly, in a case where the human presence sensor is connected to the USB controller unit 122 of the MFP controller 100 via the USB I/F, when the human presence sensor detects an approaching person, an interrupt from the USB controller unit 122 to the power saving control unit 120 is generated. Consequently, the controller power supply unit 121 can be reset.

A case in which "power saving information representing the second power saving state is specified by the specification unit from the identification information acquired from the peripheral device connected to the information processing apparatus", as described in the appended claim, corresponds to a case where NO in step S206 and YES in step S207 in FIG. 2. On the other hand, a case in which "power saving information representing the first power saving state is specified by the specification unit from the identification information acquired from the peripheral device connected to the information processing apparatus, whereas power saving information representing the second power saving state is not specified by the specification unit", as described in the appended claim, corresponds to a case where YES in step S206 in FIG. 2.

FIG. 7 is a flowchart of a USB device determination process performed in the MFP controller 100 when a USB device is connected thereto.

As illustrated in FIG. 7, in step S700, the CPU 105 of the MFP controller 100 monitors signals from a plurality of USB I/Fs equipped in the MFP controller 100. In step S701, the CPU 105 determines whether each USB data signal (i.e., an output signal of each of one pair of a D+ signal line and a D– Signal line) from each USB I/F has a High level. When the CPU 105 determines that the USB data signal has a High level (YES in step S701), the CPU 105 recognizes that a USB device is connected to the MFP controller 100.

When the USB device is connected to the USB controller unit 122 of the MFP controller 100 via the USB I/F, in step S702, the CPU 105 acquires USB class IDs of all USB devices connected thereto. In addition, in step S703, the CPU 105 registers an event that the USB devices are connected to the MFP controller 100.

Subsequently, in step S704, the CPU 105 continues to monitor whether the shift time to the sleep state which is prescribed in the shift-to-sleep-state illustrated in FIG. 5 has elapsed since the USB device is connected to the USB controller unit 122. If the shift time to the sleep state has elapsed (i.e., a shift condition is satisfied) (YES in step S704), in step S705, the CPU 105 refers to the shift-to-sleep-state management table illustrated in FIG. 5, based on the class IDs, and determines to shift the MFP controller 100 to the sleep state.

Processing performed in steps S704 and S705 illustrated in FIG. 7 correspond to a case in which "the control unit causes the information processing apparatus to shift to a power saving state according to power saving information associated with the identification information acquired from the peripheral device connected to the information processing apparatus when the shift time according to the shift time information associated with the identification information has elapsed while no operation is performed on the information processing apparatus," as described in the appended claim.

The MFP according to the present exemplary embodiment includes the shift-to-sleep-state management table illustrated in FIG. 5 for determining which of the sleep states the MFP controller 100 is shifted to according to the type of the USB device to be connected thereto. Consequently, precise control for shifting to the sleep state is performed, as desired by a user.

As described above, according to the present exemplary embodiment, when a USB device is connected to the USB controller unit 122 of the MFP controller 100 via the USB I/F, a power saving control operation is performed by determining whether the MFP controller 100 can be shifted to a power saving state. More specifically, the power saving control operation including the following control is performed.

In a case where no USB device is connected to the MFP when a predetermined time has elapsed while no operations are performed on the MFP after the MFP is activated, the MFP controller 100 is shifted to the sleep state 1. In a case where the USB device, corresponding to which the MFP controller 100 is allowed to be shifted to the sleep state 1, is connected to the MFP when a predetermined time has elapsed while no operations are performed on the MFP after the MFP is activated, the MFP controller 100 is shifted to the sleep state 1. In a case where the USB device, corresponding to which the MFP controller 100 is allowed to be shifted to the sleep state 2, is connected to the MFP when a predetermined time has elapsed while no operations are performed on the MFP after the MFP is activated, the MFP controller 100 is shifted to the sleep state 2.

Consequently, precise power saving control can be achieved according to characteristics of the USB device connected to the USB controller unit 122 of the MFP controller 100.

In the foregoing description of the exemplary embodiment, the authentication device 124, the keyboard 125, and the USB memory 126 have been cited as the examples of the USB device to be connected to the MFP of the configuration illustrated in FIG. 1. However, the USB device to be connected to the MFP according to the present invention is not limited thereto. According to the present invention, as described in the shift-to-sleep-state table, various USB devices, such as a biometric authentication device, a human presence sensor, a multimedia card reader, a Bluetooth communication device, and an IrDA communication device can be employed as the USB device to be connected to the MFP.

In the above exemplary embodiment, it has been described by way of example that shift time taken to shift the information processing apparatus to a sleep state is indicated in the shift-to-sleep-state management table. More specifically, the shift time to the sleep state is set at 1 minute when a human presence sensor is connected to the MFP. Alternatively, the shift time to the sleep state is set at 10 minutes when a Bluetooth communication device, an IrDA communication device, or a keyboard is connected thereto, or when no USB device is connected thereto. However, the shift time to the sleep state according to the present invention is not limited thereto. The shift time to the sleep state can be changed according to the specifications of the MFP.

In the above exemplary embodiment, it has been described by way of example that three USB I/Fs are installed in the USB controller unit 122 of the MFP controller 100. However, a number of USB I/Fs according to the present invention is not limited to three. The number of USB I/Fs can be arbitrarily determined according to the specifications of the MFP.

In the foregoing description of the exemplary embodiment, an MFP has been cited as an example of the information processing apparatus. However, the information processing apparatus according to the present invention is not limited thereto. The present invention can be widely applied to various information processing apparatuses, as long as such an information processing apparatus can be electrically connected to a USB device and can be shifted to a power saving state.

The present invention can be realized by supplying a system or an apparatus with a storage medium in which a software program code which implements the functions of the above exemplary embodiment is stored, and causing a computer (or CPU or micro-processor unit (MPU)) of the system or apparatus to read out the program code stored in the storage medium.

In this case, the program code itself read from the storage medium implements the functions of the above exemplary embodiment, and thus the storage medium which stores the program code constitutes the present invention.

Examples of the storage medium for supplying the program code include a floppy disk, an HD, a magnetic-optical disk, a compact-disk ROM (CD-ROM), a CD-recordable (CD-R), a CD-rewritable (CD-RW), a digital-versatile-disk-ROM (DVD-ROM), a DVD-RAM (DVD-RAM), a DVD-rewritable (DVD-RW), a DVD-plus-rewritable (DVD+RW), a magnetic tape, a nonvolatile memory card, and a ROM. Alternatively, the program can be downloaded via a network.

Implementation of the functions of the above exemplary embodiment by executing a program code read out by a computer is included in the present invention. In addition, implementation of the functions of the above exemplary embodiment by causing an operating system (OS) or the like running on the computer to perform a part or all of the actual operations based on instructions of the program code is included in the present invention.

The present invention includes implementation of the functions of the above exemplary embodiment by writing a program code read out from the storage medium to a memory provided on a function expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-154128 filed Jun. 12, 2008, which is hereby incorporated by reference herein in its entirety.

What is claimed is:

1. A printing apparatus comprising:
a controller which includes a processor and a memory;
and a Universal Serial Bus (USB) controller which is able to communicate with a USB device connected to a USB interface;
wherein the controller identifies a type of the USB device based on device information, of the USB device, acquired from the USB device connected to the USB interface, and
wherein the controller, based on a predetermined condition being satisfied in which no operation is performed by the printing apparatus, shifts the printing apparatus to a first power state in which power supply to the processor and the USB controller is stopped if the USB device is a first type device,
and shifts the printing apparatus to a second power state in which power supply to the processor is stopped and power is supplied to the USB controller if the USB device is a second type device;
and
wherein the first and second power states are sleeps states.

2. The printing apparatus according to claim 1, wherein the USB device is a card reader, a biometric authentication device, a human sensor, a USB memory, a Bluetooth communication device, an IrDA communication device, or a keyboard.

3. The printing apparatus according to claim 1, further comprising:
a storage which stores setting information indicating whether or not to permit shifting to the first power state, with respect to each type of a USB device;
wherein the controller, based on the predetermined condition being satisfied,
shifts the printing apparatus to the first power state if the identified type, of the USB device, corresponds to the setting information indicating that shifting to the first power state is permitted, and
shifts the printing apparatus to the second power state if the identified type, of the USB device, corresponds to the setting information indicating that shifting to the first power state is not permitted.

4. The printing apparatus according to claim 1, wherein in the first power state, power supply to the USB device is stopped, and in the second power state, power is supplied to the USB device.

5. The printing apparatus according to claim 1, wherein the controller, based on the predetermined condition being satisfied, shifts the printing apparatus to the first power state if the USB device is not connected to the USB interface.

6. The printing apparatus according to claim 1, wherein the predetermined condition is that a predetermined time has elapsed without user operations.

7. The printing apparatus according to claim 3, wherein the device information acquired by the USB controller includes at least one of a class identification (ID) representing a class of the USB device, a vendor ID representing a manufacturer of the USB device, and a product ID representing a type of an integrated circuit (IC) constituting the USB device.

8. The printing apparatus according to claim 1, further comprising an image forming unit configured to form an image on a sheet.

9. A printing method comprising:
communicating with a Universal Serial Bus (USB) device connected to a USB interface;
wherein a controller identifies a type of the USB device based on device information, of the USB device, acquired from the USB device connected to the USB interface, and
wherein the controller, based on a predetermined condition being satisfied in which no operation is performed by the printing apparatus, shifts a printing apparatus to a first power state in which power supply to a processor and the USB controller is stopped, if the USB device is a first type device,
and shifting the printing apparatus to a second power state in which power supply to the processor is stopped and power is supplied to the USB controller if the USB device is a second type device;
and
wherein the first and second power states are sleeps states.

10. A non-transitory computer-readable storage medium storing a program for causing a computer to execute a printing method comprising:

> communicating with a Universal Serial Bus (USB) device connected to a USB interface;
>
> wherein a controller identifies a type of the USB device based on device information, of the USB device, acquired from the USB device connected to the USB interface, and
>
> wherein the controller, based on a predetermined condition being satisfied in which no operation is performed by the printing apparatus, shifts a printing apparatus to a first power state in which power supply to a processor and the USB controller is stopped, if the USB device is a first type device,
>
> and shifting the printing apparatus to a second power state in which power supply to the processor is stopped and power is supplied to the USB controller if the USB device is a second type device;
>
> and
>
> wherein the first and second power states are sleeps states.

11. The printing apparatus according to claim 1, wherein the controller, based on a return instruction being received from the USB device, shifts the printing apparatus from the second power state to a third power state in which power is supplied to the processor and the USB controller.

12. The printing apparatus according to claim 1, further comprising a plurality of USB interfaces, > wherein the controller, based on the predetermined condition being satisfied, shifts the printing apparatus to the first power state if each of a plurality of USB devices connected to the plurality of USB interfaces is the first type device.

* * * * *